United States Patent
Cho et al.

(10) Patent No.: US 10,132,984 B2
(45) Date of Patent: Nov. 20, 2018

(54) OPTICAL SHEET ASSEMBLY AND BACKLIGHT UNIT COMPRISING SAME

(71) Applicant: LMS CO., LTD, Pyeongtaek-si, Gyeonggi-do (KR)

(72) Inventors: Sung Sik Cho, Suwon-si (KR); Dong Cheol Lee, Suwon-si (KR); Tae Jun Lee, Osan-si (KR); Hee Jeong Kim, Osan-si (KR); Ki Wook Lee, Anyang-si (KR); Jang Hee Cho, Suwon-si (KR); Byoung Hun Lee, Osan-si (KR)

(73) Assignee: LMS CO., LTD, Pyeongtaek-si (KR)

( * ) Notice: Subject to any disclaimer, the term of this patent is extended or adjusted under 35 U.S.C. 154(b) by 155 days.

(21) Appl. No.: 15/110,493

(22) PCT Filed: Jan. 6, 2015

(86) PCT No.: PCT/KR2015/000117
§ 371 (c)(1),
(2) Date: Jul. 8, 2016

(87) PCT Pub. No.: WO2015/105317
PCT Pub. Date: Jul. 16, 2015

(65) Prior Publication Data
US 2016/0334564 A1    Nov. 17, 2016

(30) Foreign Application Priority Data
Jan. 10, 2014   (KR) .......................... 10-2014-003298

(51) Int. Cl.
*F21V 8/00* (2006.01)
*G02F 1/1335* (2006.01)

(52) U.S. Cl.
CPC ......... *G02B 6/0051* (2013.01); *G02B 6/0053* (2013.01); *G02F 1/133528* (2013.01);
(Continued)

(58) Field of Classification Search
CPC ................ G02B 6/0051; G02B 6/0053; G02F 1/133528; G02F 1/133606; G02F 2011/133607
See application file for complete search history.

(56) References Cited

U.S. PATENT DOCUMENTS

| | | | |
|---|---|---|---|
| 2011/0002144 A1* | 1/2011 | Park | G02B 5/02 362/620 |
| 2011/0051047 A1* | 3/2011 | O'Neill | G02B 6/0096 349/67 |
| 2016/0341882 A1* | 11/2016 | Cho | G02B 5/02 |

FOREIGN PATENT DOCUMENTS

| | | |
|---|---|---|
| JP | 2007155940 A | 6/2007 |
| KR | 100854752 B1 | 8/2008 |
| KR | 20110072842 A | 6/2011 |

OTHER PUBLICATIONS

Int'l Search Report dated Apr. 29, 2015 in Int'l Application No. PCT/KR2015/000117.

* cited by examiner

*Primary Examiner* — Stephen F Husar
(74) *Attorney, Agent, or Firm* — Novick, Kim & Lee, PLLC; Jae Youn Kim

(57) ABSTRACT

Disclosed is an optical sheet assembly comprising: a first optical sheet which comprises a first base film and a first optical pattern formed on the first base film, light being incident on the first base film; a second optical sheet which comprises a second base film and a second optical pattern formed on the second base film, the light exiting from the first optical sheet being incident thereon; and a third optical sheet which comprises a third base film and a third optical pattern formed on the third base film, the light exiting from the second optical sheet being incident thereon, wherein the first to third optical patterns perform light condensing or diffusing function, the first optical sheet is joined with the
(Continued)

second optical sheet, and the second optical sheet is joined with the third optical sheet.

13 Claims, 11 Drawing Sheets

(52) U.S. Cl.
CPC .................. *G02F 1/133606* (2013.01); *G02F 2001/133607* (2013.01)

OPTICAL SHEET ASSEMBLY AND BACKLIGHT UNIT COMPRISING SAME

CROSS-REFERENCE TO RELATED APPLICATION

This application is a Section 371 of International Application No. PCT/KR2015/000117, filed Jan. 6, 2015, which was published in the Korean language on Jul. 16, 2015, under International Publication No. WO 2015/105317 A1, and the disclosure of which is incorporated herein by reference.

TECHNICAL FIELD

The present invention includes an optical sheet assembly in which a plurality of optical sheets is integrally fabricated.

BACKGROUND ART

The liquid crystal display device is a display device that is used for a notebook computer, a personal computer, a smart phone, a TV and the like, and its characteristics are also improved every year according to expansion of demand for the liquid crystal display device.

A liquid crystal panel of a liquid crystal display device as a non-light emitting element structurally requires a backlight unit. The backlight unit includes a light source and a plurality of optical sheets. The optical sheets diffuse or condense the incident light to supply uniform light to the liquid crystal panel.

However, because each of a prism sheet and a diffusion sheet used in a general backlight unit is separately manufactured and joined at the backlight assembling process, there is a problem in which the manufacturing of the backlight unit becomes complicated and its thickness increases.

DISCLOSURE

Technical Problem

An aspect of the present invention provides an optical sheet assembly in which a plurality of optical sheets is integrally manufactured and can be thinned.

Further, another aspect of the present invention provides an optical sheet assembly with improved flatness by adjusting the thickness of the plurality of optical sheets.

Further, still another aspect of the present invention provides an optical sheet assembly with excellent optical properties.

Technical Solution

According to an aspect of the present invention, there is provided an optical sheet assembly that includes a first optical sheet which includes a first base film and a first optical pattern formed on the first base film, light being incident on the first base film; a second optical sheet which includes a second base film and a second optical pattern formed on the second base film, the light exiting from the first optical sheet being incident thereon; and a third optical sheet which includes a third base film and a third optical pattern formed on the third base film, the light exiting from the second optical sheet being incident thereon, wherein the first to third optical patterns perform light condensing or diffusing function, the first optical sheet is joined with the second optical sheet, and the second optical sheet may be joined with the third optical sheet.

In an embodiment, the first optical sheet performs the diffusing function, and the second optical sheet and the third optical sheet perform the light condensing function.

In an embodiment, at least one of the second base film and the third base film may have a plurality of protruding division regions formed on the back side.

In an embodiment, the division regions may be adjacent to each other and may be formed over the entire back side of the base film.

In an embodiment, the division regions may be partitioned by a line-shaped groove.

In an embodiment, the thickness of the first base film, the second base film and the third base film satisfies the relational formula 1 below.

$$D2 > D3 > D1 \qquad [\text{Formula 1}]$$

At this time, each of D1, D2, and D3 means the thickness of the first base film, the second base film and the third base film.

In an embodiment, the first optical sheet may have a diffusion pattern that is formed on at least one side of one side and the other side of the first base film.

In an embodiment, a diffusion pattern is formed on one side and the other side of the first optical sheet, and the diffusion pattern is made up of an engraved pattern or an embossed pattern.

In an embodiment, an air gap may be formed between the second optical sheet and the first optical sheet.

In an embodiment, the optical pattern of the second optical sheet may be partially joined to the protruding division region formed on the back side of the third base film.

In an embodiment, the first optical pattern is made up of the diffusion pattern, the second and third optical patterns are made up of the light condensing pattern, the first optical pattern is joined to the second optical sheet, and the second optical patterns may be joined to the third optical sheet.

In an embodiment, the first optical pattern may be joined to the second base film.

The backlight unit and the display device according to the present invention may include the above-described assembly.

Advantageous Effects

According to an aspect of the present invention, a plurality of optical sheets can be integrally manufactured and can be made thinner.

Moreover, according to another aspect of the present invention, flatness of the integrally manufactured optical sheet is improved, and excellent optical characteristics are achieved.

BEST MODE

Figure 1:
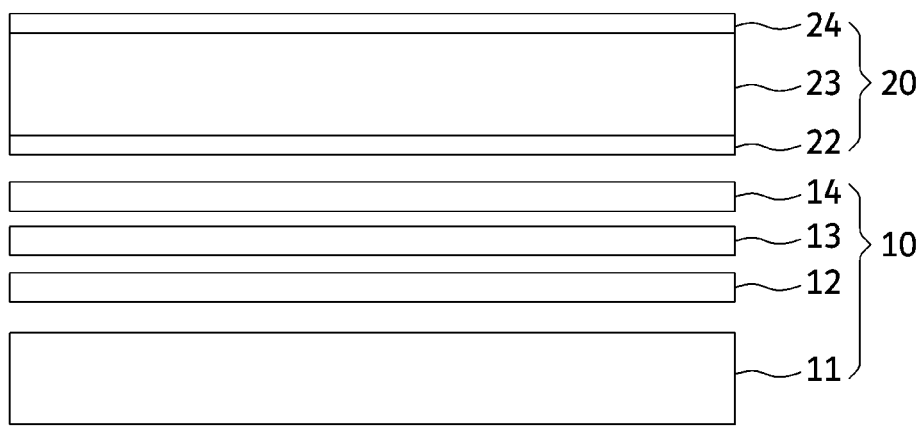
FIG. 1 is a conceptual diagram of a display device according to an embodiment of the present invention.

Hereinafter, embodiments of the invention will be described in detail with reference to the accompanying drawings. The drawings are attached hereto to help explain exemplary embodiments of the invention, and the present invention is not limited to the drawings and embodiments. In the drawings, some elements may be exaggerated, reduced in size, or omitted for clarity or conciseness.

Since the present invention may be varied variously and may have several embodiments, specific embodiments will be illustrated in the drawing and will be described in the detailed description in detail.

Although terms including ordinal numbers such as first and second may be used to describe various constituent elements, the constituent elements are not limited by the above-described terms.

The above-described terms are used only to distinguish one constituent element from another constituent element. For example, without departing from the scope of the present invention, a second constituent element may be named as a first constituent element, and the first constituent element may also be similarly named as the second constituent element.

When it is mentioned that one constituent element is "connected" or "linked" to another constituent element, although the one constituent element may be directly connected or linked to another constituent element, it should be understood that still another constituent element may also be present between them.

Meanwhile, when it is mentioned that one constituent element is "directly connected" or "directly linked" to another constituent element, it should be understood that still another constituent element is not present between them.

The terms used in the present invention are simply used for the purpose of describing particular embodiments and are not intended to limit the present invention. Expressions of the singular number include expressions of the plural number, unless they are meant in a contextually and clearly different manner.

In the present invention, it should be understood that terms such as "including" or "having" specify that features, numbers, steps, operations, constituent elements, components or a combination thereof described in the specification are present, rather than excluding in advance the possibility of the presence or addition of one or more other features, numbers, steps, operations, constituent elements, components or a combination thereof.

Also, the drawings attached in the present invention should be understood as being enlarged or reduced for convenience of explanation.

Now, the present invention will be described in detail with reference to the drawings, identical or corresponding constituent elements are denoted by the same reference numbers regardless of the reference numerals, and the repeated description thereof will not be provided.

FIG. 1 is a conceptual diagram of a display device according to an embodiment of the present invention.

The display device according to an embodiment of the present invention includes a backlight unit 10 and a display panel 20. The display panel 20 achieves an image by adjusting the amount of transmission of light provided from the backlight unit 10. Such a display panel 20 may be a liquid crystal panel. Specifically, the display panel 20 includes a TFT substrate 22, a color filter 24, and liquid crystal 23 filled between the TFT substrate 22 and the color filter 24.

Although it is not illustrated, polarizing plates may be further included on top and bottom surfaces of the display panel 20. Accordingly, it is possible to adjust the amount of light discharged through the polarizing plates, by adjusting the voltage applied to the liquid crystal 23 to deform the alignment direction of the liquid crystal.

The backlight unit 10 includes a light guide plate 11 and a plurality of optical sheets 12, 13 and 14, and supplies the light emitted from a light source (not illustrated) to the display panel 20. As the backlight unit 10, a side-type backlight unit and a direct-type backlight unit may be selected depending on the position where the light source is disposed.

The backlight unit 10 includes a plurality of optical sheets 12, 13 and 14. Such optical sheets diffuse or condense the incident light to supply uniform light to the liquid crystal panel. In the present invention, the plurality of optical sheets 12, 13 and 14 are joined to form a single assembly.

Figure 2:
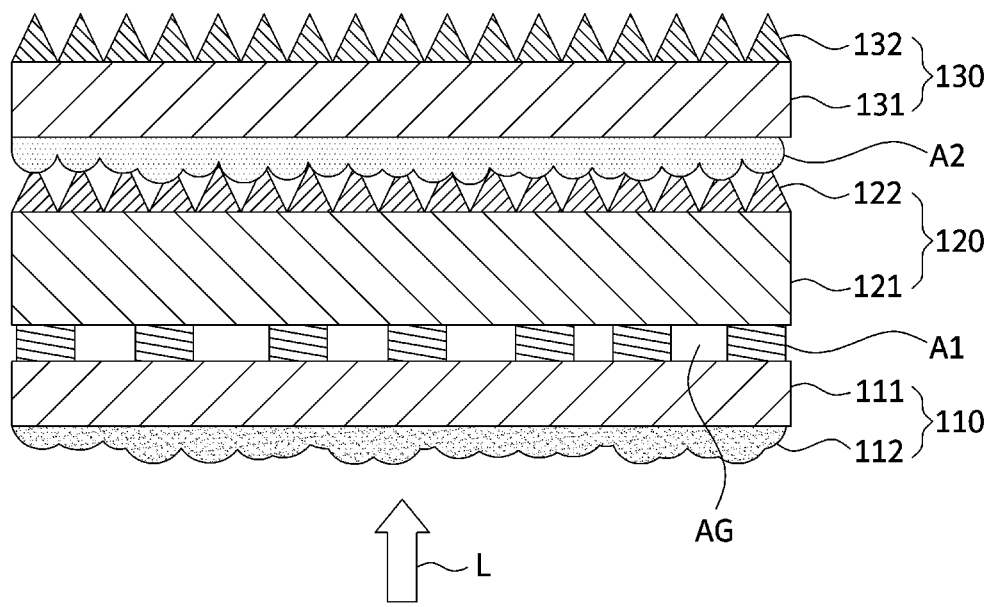
FIG. 2 is a conceptual diagram of an optical sheet assembly according to an embodiment of the present invention.

FIG. 2 is a conceptual diagram of an optical sheet assembly according to an embodiment of the present invention.

Referring to FIG. 2, the optical sheet assembly 100 according to an embodiment of the present invention includes a first optical sheet 110 having one side on which the light L enters, a second optical sheet 120 on which the light emitted from the first optical sheet 110 enters, and a third optical sheet 130 on which the light emitted from the second optical sheet 120 enters.

In each of the optical sheets 110, 120 and 130, optical patterns performing condensing or diffusing function are formed on the base films 111, 121 and 131. As an example, a diffusion pattern 112 can be formed on the first base film 111 of the first optical sheet 110, a condensing pattern 122 can be formed on the second base film 121 of the second optical sheet 120, and a condensing pattern 132 can be formed on the third base film 131 of the third optical sheet 130.

However, this is only an example, and the patterns formed on the first to third optical sheets 110, 120 and 130 may be modified in various ways as required. As an example, the diffusion pattern may be formed on all of the first to third optical sheets 110, 120 and 130, and on the contrary, the light condensing pattern may be formed on all the sheets.

Here, the diffusion pattern is a pattern that uniformly diffuses the light incident from the light guide plate 11 and is a concept that includes all the patterns for diffusing the incident light such as a concave pattern or a convex pattern. Further, the light condensing pattern is a concept that includes all the patterns for condensing the incident light such as a prism pattern having a triangular cross-sectional shape.

Hereinafter, the description will be given of a case where the first optical sheet 110 is a diffusion sheet formed with a diffusing pattern, and the second optical sheet 120 and the third optical sheet 130 are condensing sheets formed with the light condensing pattern.

The optical sheet assembly 100 according to the present embodiment is characterized in that the first to third optical sheets 110, 120 and 130 are laminated and formed integrally. As an example, a single diffusion sheet 110 and two condensing sheets 120 and 130 are joined together while being laminated.

The base films 111, 121 and 131 included in the first to the third optical sheets 110, 120 and 130 are formed of a transparent material. As an example of the transparent material, it is possible to use polymethylmethacrylate (PMMA) resin, polycarbonate (PC) resin, polyimide (PI) resin, polyethylene (PE) resin, polypropylene (PP) resin, methacrylic resin, polyurethane resin, polyethylene terephthalate (PET) resin or the like.

The diffusion pattern 112 can be formed on the first optical sheet 110. Although FIG. 2 illustrates a case where the diffusion pattern 112 is formed only on the bottom surface of the first base film 111, the diffusion pattern 112 may be formed only on the top surface of the first base film 111, and may be formed on both the top and bottom surfaces of the first base film 111.

The diffusion pattern 112 can have a cross-sectional shape of a random thickness, by having a non-flat surface. An average thickness of the diffusion pattern 112 may be approximately 1 μm to 15 μm.

FIG. 3 is a conceptual diagram of a diffusion sheet according to an embodiment of the present invention.

Figure 3A:
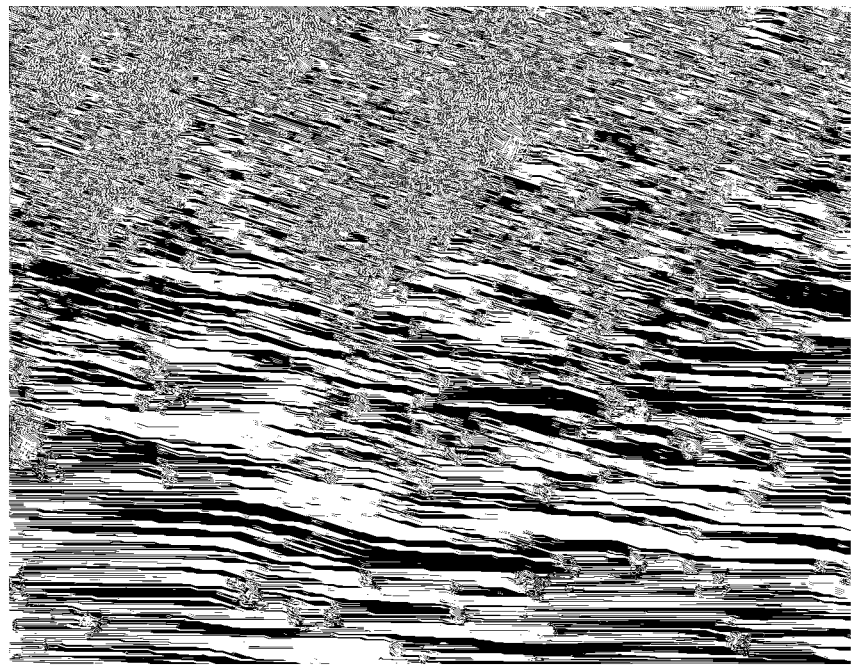
FIGS. 3a to 3e are schematic diagrams of a diffusion sheet according to an embodiment of the present invention.

As an example, the diffusion pattern 112 can be a light diffusion pattern in which a planar projection shape is in the form of a plurality of fine protrusions as illustrated in FIG. 3a. The protrusion height of the fine protrusions can be about 1 μm to 20 μm. The protrusion height of the fine protrusions may be defined as a height difference between a region in which the fine protrusions are not formed and the vertex of the fine protrusions. Further, the size of the fine protrusion may be about 11 μm to 40 μm. The size of the fine protrusion may be defined as a maximum value among distances between two points on the frame in the planar projection shape of the fine protrusions.

Figure 3B:
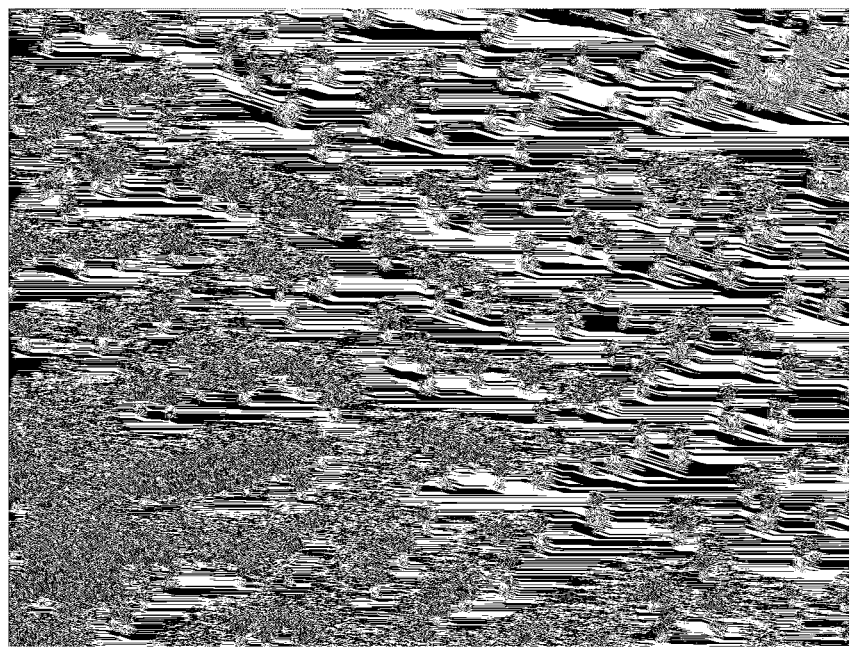

As another example, the diffusion pattern 112 can be a light diffusion pattern in which the planar projection shape is in the form of a plurality of fine grooves as illustrated in FIG. 3b. The depth of the fine groove can be about 1 μm to 20 μm. The depth of the fine groove may defined as a height difference between a region in which the fine groove is not formed and the lowest point of the fine groove. Further, the size of the fine groove may be about 1 μm to 40 μm. The size of the fine groove may be defined as a maximum value among distances between two points on the frame in the planar projection shape of the fine groove.

The planar projection shapes of the fine protrusion and the fine groove may have various shapes such as a circular shape, an elliptical shape, a polygonal shape, an irregular shape. Each of the fine protrusions or each of the fine grooves may have shapes and sizes different from each other. Spacing between the fine protrusions and the fine grooves may be irregular, and some fine protrusions and fine grooves may also be formed to be connected to each other.

As another example, the diffusion pattern 112 may include both of the fine protrusions and the fine grooves.

Figure 3C:
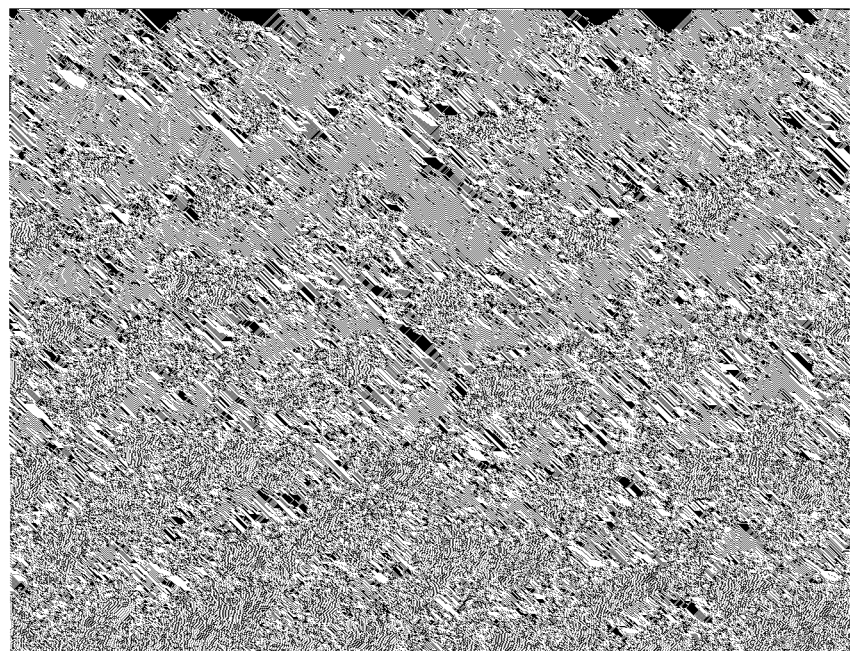

As still another example, the diffusion pattern 112 may be formed to have a periodic and continuous waveform or may be formed to have a plurality of convex division regions as illustrated in FIG. 3c. When forming the diffusion pattern 112 in the wave form, the pitch of the wave form can be about 10 μm to 150 μm. For example, the amplitude of the wave form may be approximately 1 μm to 20 μm. When forming the diffusion pattern 112 to have the convex division region on the surface, the width of the division region may be approximately 10 μm to 100 μm, and its height may be approximately 0.5 μm to 5 μm. Each of the division regions has a convex shape protruding toward the outside, and a boundary between the division regions has a relatively concave shape by the convex shape.

The pitch of the wave shape may be defined as a distance between vertices of the convex portion or a distance between grooves of the concave portion in the periodically repeated wave, and the amplitude of the wave form may be defined as a height difference between a highest point and a lowest point on the surface on which the wave form is formed. The width of the division region may be defined as a maximum value among the distances between the two points on the frame of each division region at the time of planar projection, and the height may be defined as a height difference between the highest point and the lowest point on the surface on which the division region is formed.

Figure 3D:
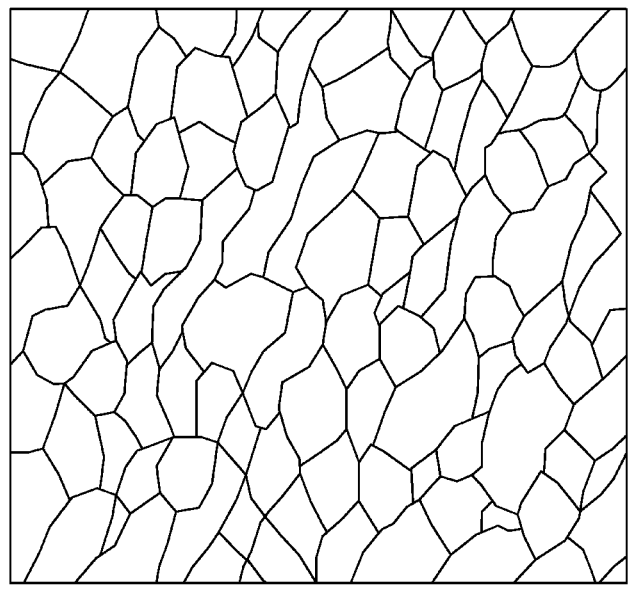
Figure 3E:
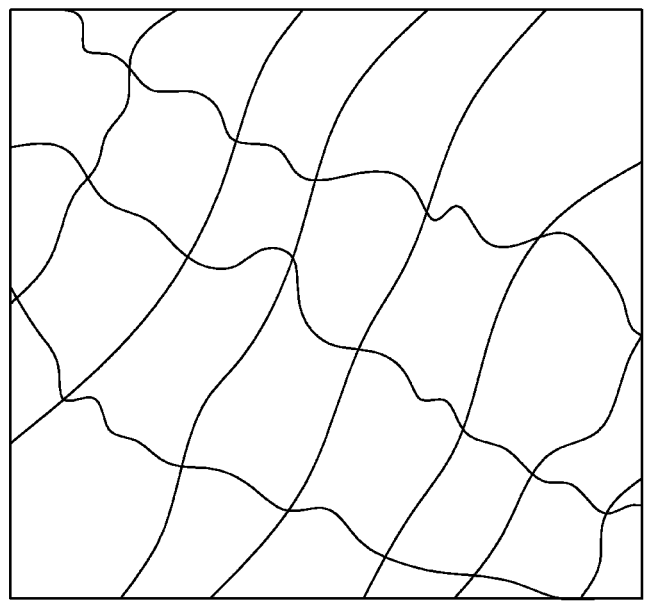

The division regions can be formed in various shapes, as illustrated in FIGS. 3d and 3e. Specifically, the planar projection shape of each division region can have various shapes such as a circular shape, an elliptical shape, a rhombic shape, a polygonal shape and an irregular shape, and each of the planar projection shape, the height and the size of division regions may be different from each other, and a boundary of the division region may be a straight line or a curved line. Further, the size and shape of such a division region are not limited.

The height fine protrusions, the depth of the fine grooves, the amplitude and pitch of the wave shape, the width and height and depth of the division region, the density of the fine protrusions and grooves diffusion pattern 112 etc. can be appropriately adjusted depending on the required degree of the light diffusion. For example, the height of the fine protrusions, the depth of the fine grooves, the amplitude and pitch of the wave shape, the width and height or depth of the division region, the density of the fine protrusions and grooves etc. can be differently set depending on turbidity (Haze) of the first optical sheet 110. The turbidity (Haze) of the first optical sheet 110 is desirably 5 to 40%.

Conventionally, the diffusing function has been given by forming a diffusion layer including a bead made of a PMMA material. In that case, there has been a problem of damage of the surface of the light guide plate 11 coming into contact with the bead due to the bead. However, since the diffusion pattern 112 is used without the use of the bead in the present invention, it is possible to prevent a problem of damage of the light guide plate 11 due to the use of the beads.

The light condensing patterns 122 and 132 can be formed on the second optical sheet 120 and the third optical sheet 130. Each of the light condensing patterns 122 and 132 has a prism shape of a triangular cross section. The second optical sheet 120 and the third optical sheet 130 are disposed so that the extension directions of the light condensing patterns 122 and 132 intersect with each other to condense the light emitted from the first optical sheet 110.

Figure 4A:
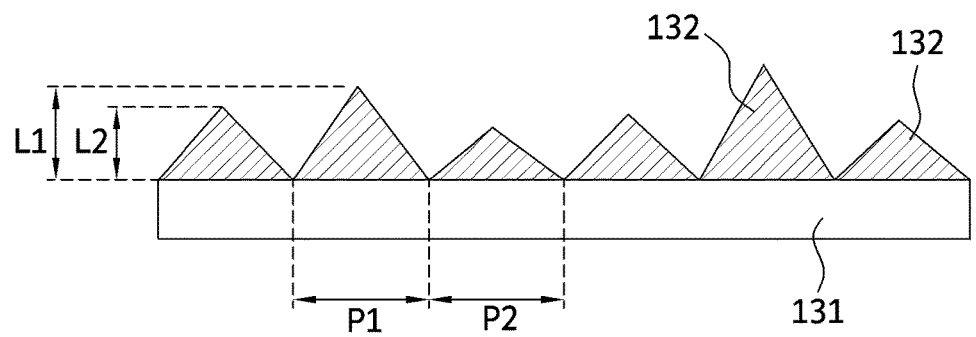
FIGS. 4a and 4b are schematic diagrams of a condensing sheet according to an embodiment of the present invention.

Although the light condensing patterns 122 and 132 may be formed to have the same height, the heights L1 and L2 may be different from each other as illustrated in FIG. 4a. Further, the pitch of the light condensing patterns P1 and P2 can also be formed at random. In this case, the apex angles of the high condensing patterns and the low condensing patterns may be different from each other. At this time, the apex angle means an angle formed between both the inclined surfaces at the cross section of the light condensing pattern. When differently forming the heights of the light condensing patterns 122 and 132, it is possible to suppress various defects due to friction between the first optical film 110 and the second optical film 120 or the friction between the second optical film 120 and other optical components disposed above the second optical film 120.

Figure 4B:
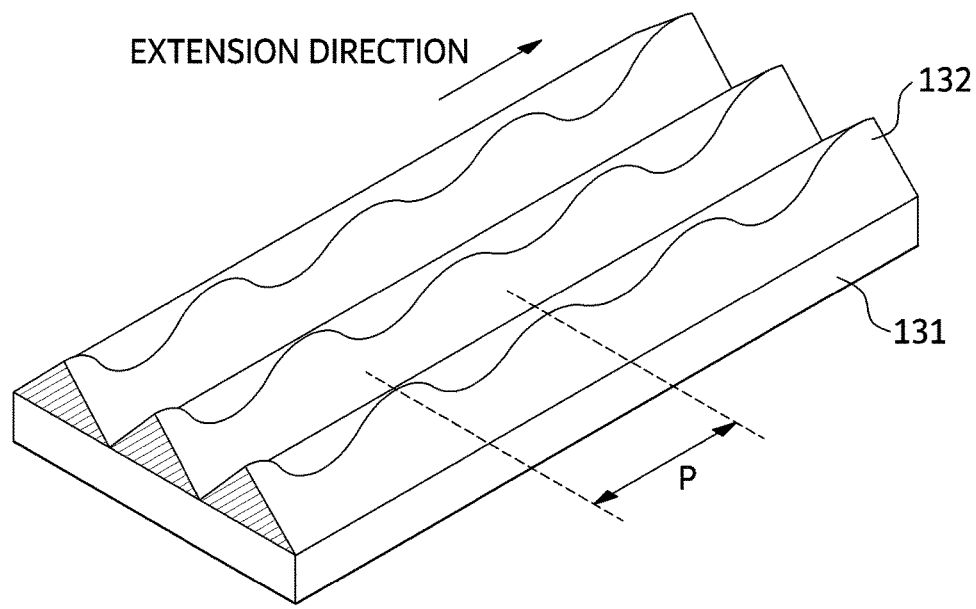

Meanwhile, as illustrated in FIG. 4b, the height of the light condensing patterns 122 and 132 of the present invention can change along the extension direction. In this case, although the period P at which the height changes may be constant, the height may irregularly change.

As still another example, although the shape of the light condensing pattern 122 of the second optical sheet 120 and the shape of the light condensing pattern 132 of the third optical sheet 130 may be the same or different from each other. For example, although the heights of condensing pattern 122 of the second optical sheet 120 are different from each other as illustrated in FIG. 4a, the heights can be constant in the extension direction. The heights of the light condensing patterns 132 of the third optical sheet 130 may irregularly change in the extension direction as illustrated in FIG. 4b. In this way, when changing the height of the light condensing pattern 122 of the second optical sheet 120, the number of condensing patterns coming into contact with the third optical sheet 130 decreases to be able to prevent optical defects such as wet-out, and it is possible to adjust an incidence angle by a change in refraction direction of light generated as a result of a change in height of the third optical sheet 130 in the extension direction.

Here, the wet-out is a phenomenon in which a contact portion is viewed relatively brighter than a non-contact portion due to a difference in light transmittance between the mutual contact portion and the non-contact portion in the adjacent optical sheets, and the phenomenon causes irregularity of the image displayed in the display device. However, when changing the height of the light condensing pattern 122 of the second optical sheet 120, the number of the light condensing patterns coming into contacted with the third optical sheet 130 decreases, the contact portion decreases, the size of the region viewed bright decreases, and thus, a user cannot visually recognize the region.

Each of the diffusion pattern 112 and the light condensing patterns 122 and 132 can be formed by using the curable resin that is cured by ultraviolet ray or heat. For example, the diffusion pattern 112 and the light condensing patterns 122 and 132 can be formed, by curing the curable resin using ultraviolet ray or heat, after applying the curable resin onto the base films 111, 121 and 131. The diffusion pattern 112 can be formed by curing the curable resin using ultraviolet ray or heat, while being pressed with a stamp formed with a shape corresponding to the shape of the diffusion pattern, and the light condensing patterns 122 and 132 can be formed by curing the curable resin using ultraviolet ray or heat, while being pressed with a stamp formed with a shape corresponding to the shapes of the light condensing patterns 122 and 132.

Hereinafter, a process of forming an assembly by joining the first to third optical sheets 110, 120 and 130 will be described in more detail.

Figure 5:
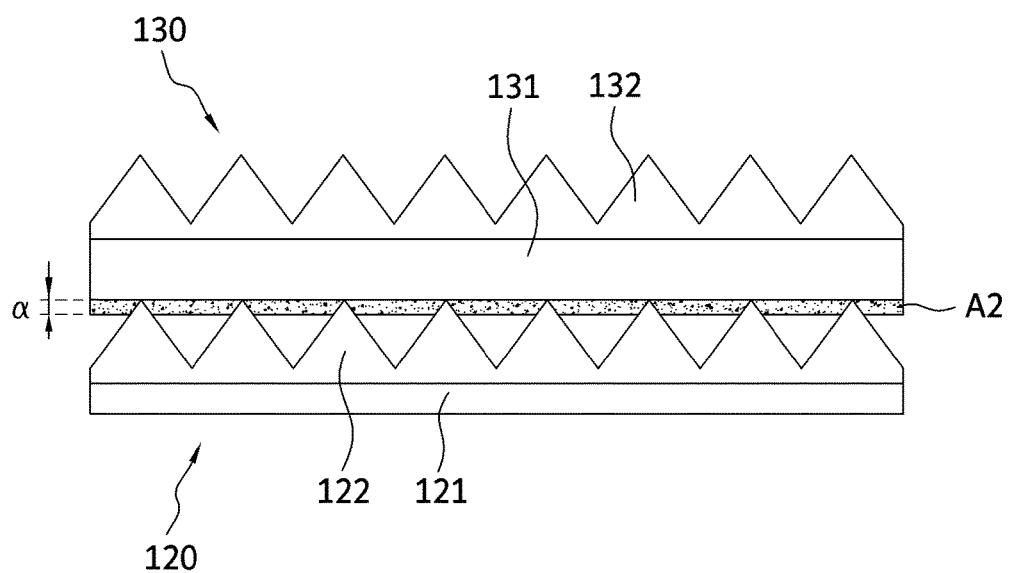
FIG. 5 is a conceptual diagram illustrating a joining state of a second optical sheet and a third optical sheet according to an embodiment of the present invention.
Figure 6:
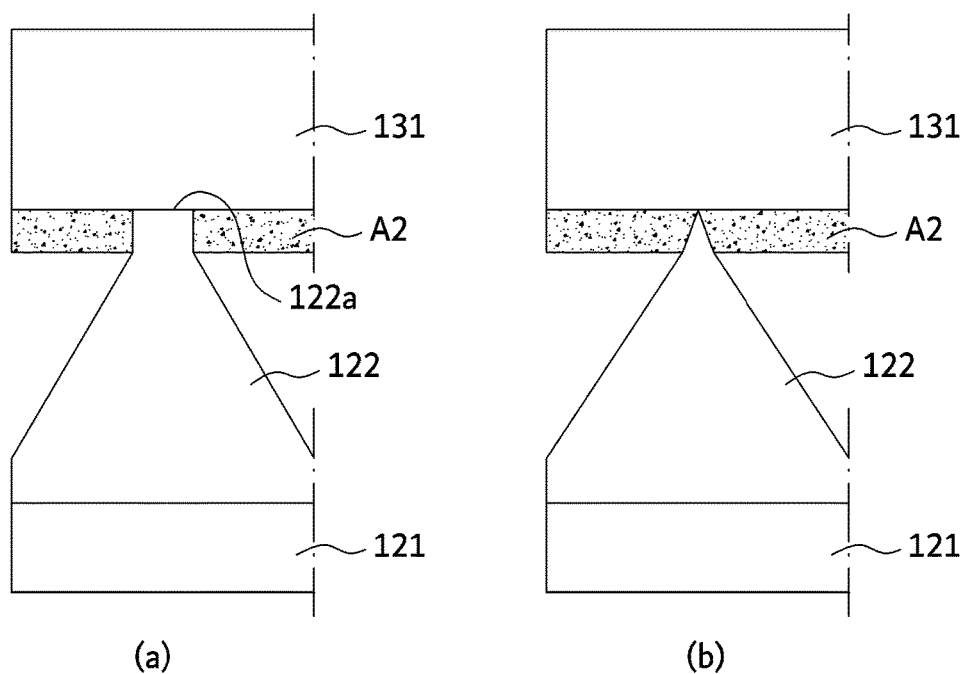
FIGS. 6 and 7 are modified examples of FIG. 5.
Figure 7:
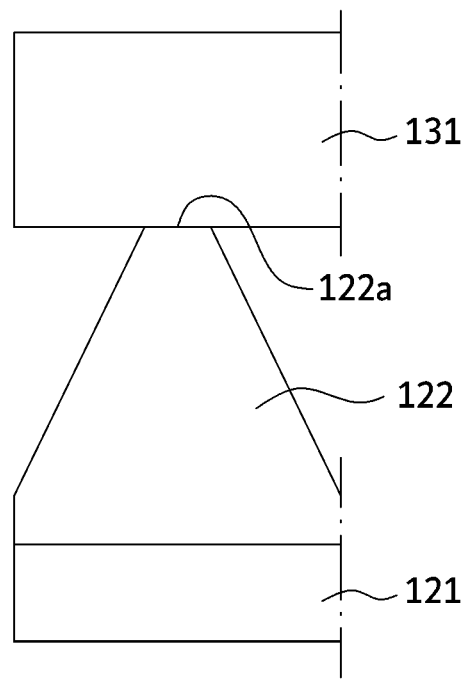

FIG. 5 is a conceptual diagram illustrating a joining state of the second optical sheet 120 and the third optical sheet 130 according to an embodiment of the present invention, and FIGS. 6 and 7 are modified examples of FIG. 5.

Referring to FIG. 5, the second optical sheet 120 and the third optical sheet 130 may be joined by an adhesive layer A2 provided below the third optical sheet 130. Specifically, an end portion in an upward direction of the second light condensing pattern 122 is joined, while being inserted into the adhesive layer A2. In this way, when joining the second optical sheet 120 and the third optical sheet 130, it is possible to prevent an occurrence of wrinkle in the second optical sheet 120 or the third optical sheet 130, and it is possible to reduce the thickness as compared to a case of simply laminating the two optical sheets.

At this time, the adhesive layer A2 is preferably made of material having high light transmittance. A thickness ($\alpha$) of the adhesive layer A2 may be about 0.1 μm to 50 μm, and the adhesive layer may include one or more of acrylic resins, polyester resins, one or more of the polycarbonate-based resins.

Although FIG. 5 illustrates a case where the tip end portion of the second light condensing pattern 122 is inserted into the adhesive layer A2, while maintaining the triangular shape, the shape of the distal end portion of the second light condensing pattern 122 may be modified in various ways.

FIG. 6(a) illustrates a case where a joining surface 122a is formed on the upper side of the second light condensing pattern 122. Specifically, the second light condensing pattern 122 has a pair of extension surfaces formed, while the upper side extending in the upward direction, and the joining surface 122a is provided, while the upper tip end portions of the extension surfaces being connected with each other.

In a case where joining the second optical sheet 120 and the third optical sheet 130, when the joining surface 122a comes into contact with the third base film 131 of the third optical sheet 130 as illustrated in FIG. 6(a), there is an advantage in which the second optical pattern 122 can support the third optical sheet 130, the durability of the assembly is enhanced, and it is possible to prevent an occurrence of wrinkles on the second optical sheet 120 or the third optical sheet 130. However, it is also possible to join the optical sheets, while keeping a predetermined interval between the joining surface 122a and the third base film 131, depending on the required thickness and adhesive strength of the assembly.

Meanwhile, as a modified form of FIG. 6(a), as illustrated in FIG. 6(b), a pair of extension surfaces formed on the second light condensing pattern 122 can also be formed to meet each other at the top. In this way, when forming the pair of extension surfaces formed on the second light condensing pattern 122 to meet each other at the top, because an area of a portion inserted into the adhesive layer A2 in the second light condensing pattern 122 increases, the optical sheets can be more rigidly joined.

Meanwhile, as illustrated in FIG. 7, the second optical sheet 120 and the third optical sheet 130 can also be joined without using a separate adhesive layer. That is, the light condensing pattern 122 of the second optical sheet 120 can be directly joined to the third base film 132 of the third optical sheet 130, by forming the light condensing pattern 122 of the second optical sheet 120 using an adhesive material.

When the light condensing pattern 122 of the second optical sheet 120 is directly joined to the third base film of the third optical sheet 130, after forming the light condensing pattern 122 of the second optical sheet 120 having a triangular cross-sectional shape in a pseudo curing state, the optical sheets are pressed and joined to each other, while laminating the second optical sheet 120 and the third optical sheet 130, and thereafter, the optical sheets fully cured. As a result, the joining surface 122a as illustrated in FIG. 7 is formed in the assembly in which the second optical sheet 120 and the third optical sheet 130 are joined to each other.

Figure 8:
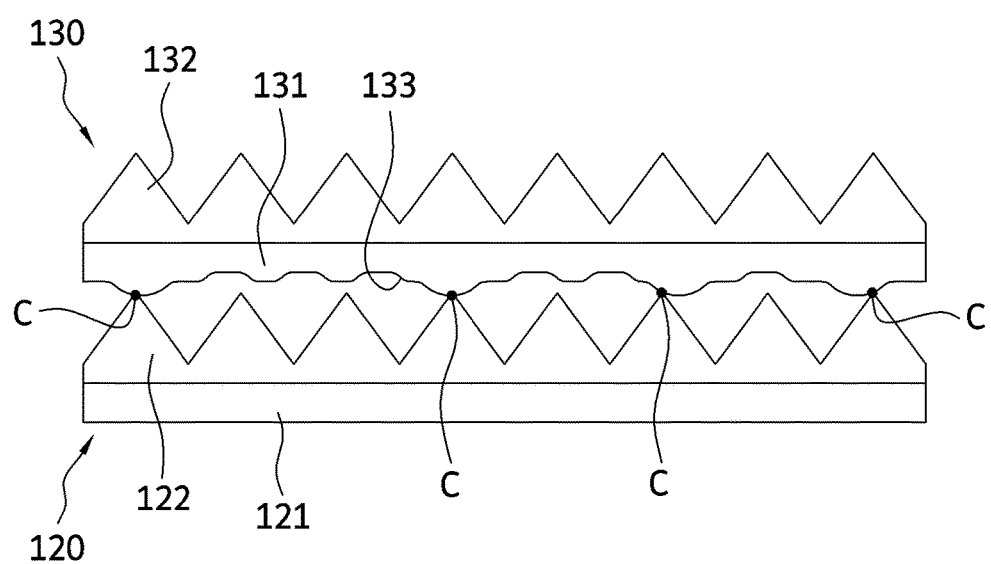
FIG. 8 is a conceptual diagram illustrating a state in which the condensing sheet is joined.

Although FIGS. 6(a) and 6(b) illustrate the case where the bottom surface of the adhesive layer A2 is a flat surface, the bottom surface of the adhesive layer A2 may be a non-flat surface as illustrated in FIGS. 2 and 8. When forming the bottom surface of the adhesive layer A2 as a non-flat surface, only some of the second light condensing pattern 122 is brought into contact with the adhesive layer A2, which makes it possible to reduce the optical defect such as wet-out. Since the shape of the non-flat surface is substantially the same as the shape of the diffusion pattern described in connection with FIG. 3, the repeated detailed description will be omitted.

Hereinafter, the joining process of the first optical sheet 110 formed with the diffusion pattern 112 and the second optical sheet 120 formed with the light condensing pattern 122 will be described in more detail.

As illustrated in FIG. 2, the first optical sheet 110 and the second optical sheet 120 may be joined to each other by the adhesive A1. That is, when the diffusion pattern 112 is formed only on the bottom surface of the first optical sheet 110 as illustrated in FIG. 2, the first optical sheet 110 and the second optical sheet 120 are joined to each other by the adhesive A1 interposed between the first base film 111 and the second base film 121.

The adhesive A1 may be totally filled between the first optical sheet 110 and the second optical sheet 120. However, as illustrated in FIG. 2, since the adhesive A1 is partially filled between the first optical sheet 110 and the second optical sheet 120, an air gap AG may be formed between the first optical sheet 110 and the second optical sheet 120.

When forming the air gap AG in this way, as compared to the case of totally filling the adhesive, the amount of light absorbed by the adhesive decreases. Thus, it is possible to reduce the loss caused by the adhesive used for joining and to minimize a decrease in luminance of the assembly.

The adhesive A1 may be applied only to a partial region of the top surface of the first optical sheet 110 as illustrated in FIG. 2. The adhesive may also be applied in the form of a line having a predetermined width and may also be applied in the form of a dot. In this case, the spacing between the adhesives A1 may be constant and may also be irregular.

Meanwhile, although FIG. 2 illustrates a case where the first optical sheet 110 and the second optical sheet 120 are joined by another adhesive A1, by forming a diffusion pattern by using an adhesive material on the top surface of the first optical sheet 100 without using another adhesive A1, both the optical sheets may be joined by the diffusion pattern 133. The shape of the diffusion pattern in this case is substantially the same as the shape of the diffusion pattern described in connection with FIG. 3, and the method of joining both the optical sheets after forming the diffusion pattern with an adhesive material is substantially the same as the joining method of the second optical sheet 120 and the third optical sheet 130 described in connection with FIG. 7. Thus, the repeated detailed description will not be provided.

As described above, in the optical sheets 110, 120 and 130 that constitute the assembly according to the present invention, the optical pattern which performs the light condensing or diffusing function is formed on the base films 111, 121 and 131.

In this case, the base films 111, 121 and 131 of the optical sheets 110, 120 and 130 are hardly contracted, and meanwhile, the resin which forms an optical pattern has shrinkage of 5% to 7% in the course of curing and there is a problem of a decrease in flatness of the optical sheet assembly.

Specifically, due to a difference in shrinkage between the base films 111, 121 and 131 and the resin forming the optical pattern upon curing after the joining, the third optical sheet 130 is bent in the upward direction that has the pattern direction, and the first optical sheet 110 is bent in the downward direction. At this time, when pressing the first to third optical sheets 110, 120 and 130 for joining, the degree of bending becomes larger. As a result, the optical characteristics of the optical sheet assembly are degraded.

Therefore, in the present invention, the thickness of the second base film 121 of the second optical sheet 120 is formed to be thicker than the thickness of the first base film 111 of the first optical sheet 110 and the third base film 131 of the third optical sheet 130 to prevent bending.

When the base film of the second optical sheet 120 is set to have the thickest thickness, it is possible to suppress the bending phenomenon of the third optical sheet 130 and the bending phenomenon of the first optical sheet 110. Accordingly, it is possible to generally suppress the bending phenomenon (CURL) of the three joining sheets to a minimum.

At this time, the thickness ratio of the second base film 121, the first base film 111 and the third base film 131 may have a ratio of 1:5 to 5:1.

Figure 9:
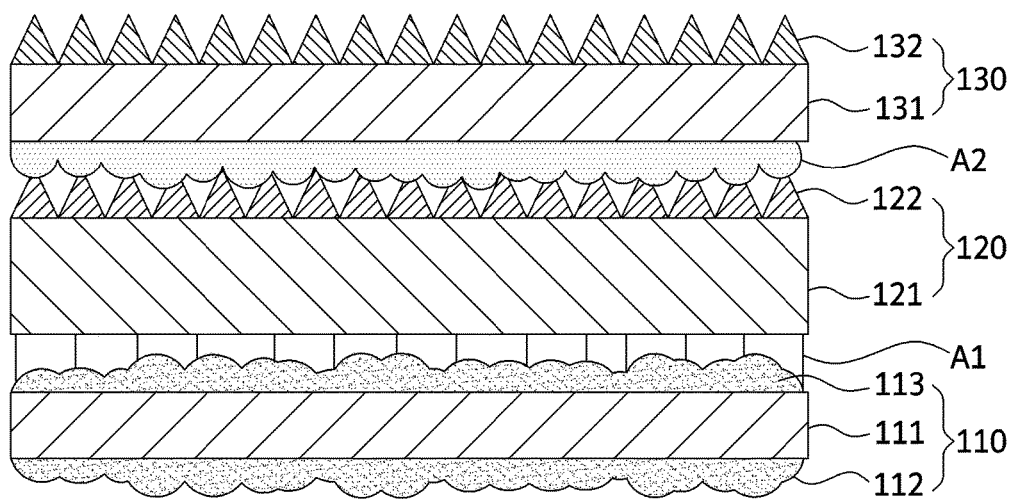
FIG. 9 is a conceptual diagram of an optical sheet assembly according to another embodiment of the present invention.

Meanwhile, the diffusion patterns 112 and 113 may be formed on both sides of the first base film 111 in the first optical sheet 110 as illustrated in FIG. 9. With this configuration, shrinkage stress of the diffusion pattern 112 formed on one side of the first base film 111 and shrinkage stress of the diffusion pattern 113 formed on the other side are offset each other, and thus, it is possible to solve a problem in which the first base film 111 is bent in one direction. Therefore, it is possible to prevent the bending even when the thickness of the first base film 111 is formed smaller than those of the second and third base films 121 and 131.

Therefore, the thickness D1 of the first base film, the thickness D2 of the second base film and the thickness D3 of the third base film can satisfy the relational formula 1 below.

$$D2 > D3 > D1 \qquad \text{[Formula 1]}$$

Figure 10:
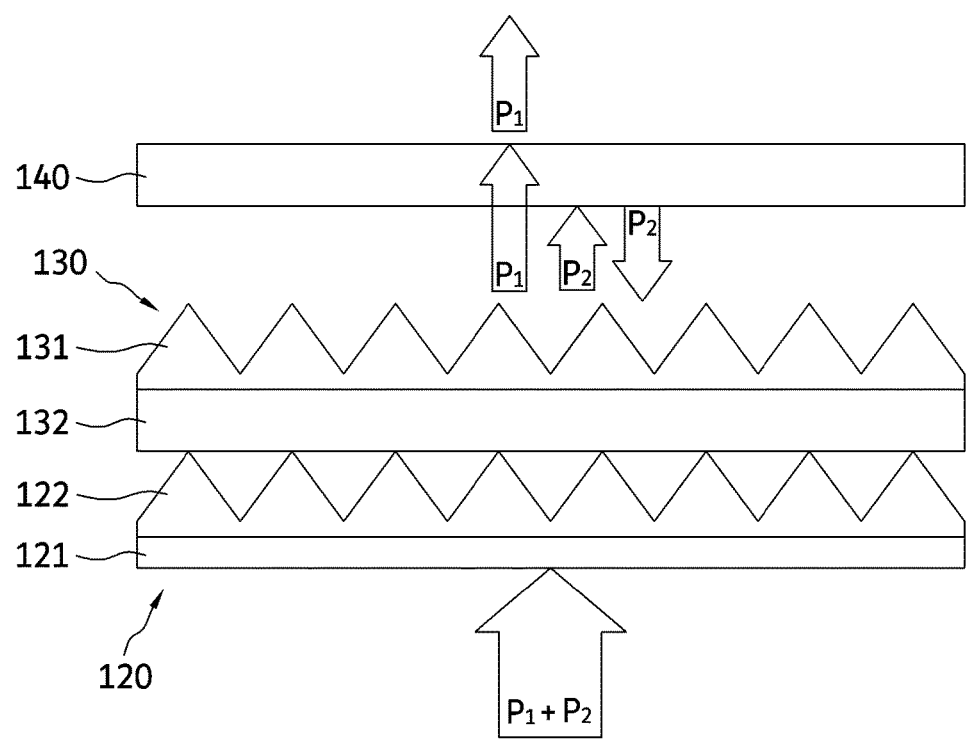
FIG. 10 is a conceptual diagram illustrating a state in which a reflective polarizer is laminated on the optical sheet according to an embodiment of the present invention.

Referring to FIG. 10, a configuration that further includes another reflective polarizer in the optical sheet module according to an embodiment of the present invention will be described as follows.

Referring to FIG. 10, the reflective polarizer 140 is laminated on the top of the third optical sheet 130 to allow the light condensed by the third optical sheet 130 and the second optical sheet 120 to selectively pass depending on the polarization states.

The reflective polarizer serves to transmit light $P_1$ of specific polarization and reflect light $P_2$ of a polarization direction different from the light the specific polarization toward the light guide plate, depending on the polarization direction of light. As the reflective polarizer 140, conventional reflective polarizers can be used without limitation.

The light reflected without passing through the reflective polarizer 140 is re-reflected at the bottom and is directed to the top again. The reflective polarizer 140 continuously repeats the role of allowing only the light of the correct polarization direction to pass through and then reflecting the remaining light.

Since only the light of the desired polarization direction is emitted to the top through the repetition of such a process, the luminance of the display device increases.

More specifically, as illustrated in FIG. 10, the reflective polarizer 140 is disposed by being laminated on the top of the third optical sheet 130, and the light condensed while passing through the second optical sheet 120 and the third optical sheet 130 is directed to the reflective polarizer 140.

Here, the light directed to the reflective polarizer 140 is in the state ($P_1+P_2$) in which lights of different polarization directions are mixed, and the light is made up of light $P_1$ having the polarization direction which is transmitted through the reflective polarizer and light $P_2$ having the polarization direction which is not transmitted through the reflective polarizer film 140.

As illustrated, although light that has passed through the third optical sheet 130 and the second optical sheet 120 is in the mixed state of $P_1$ and $P_2$, the reflective polarizer 140 transmits only the light $P_1$ and reflects the light $P_2$ in the downward direction again.

Thus, the light $P_1$ is emitted to the outside, but the light $P_2$ is reflected, goes back to the bottom, is re-reflected at the bottom of the optical sheet assembly, and moves upward again. The polarization state of the light $P_2$ is changed through this process, and is converted into a state that is suitable for transmitting reflective polarizer 140 through such a repetition.

In this way, by providing the reflective polarizer 140, it is possible to reduce the loss of light and emit light having a desired refractive angle and wavelength upward, thereby enhancing the luminance of the display module.

Meanwhile, the reflective polarizer film 140 may be disposed to be laminated on the third optical sheet 130, and may also be disposed so as to be laminated between the third optical sheet 130 and the second optical sheet 120.

While the present invention has been described above with reference to the embodiment, it would be appreciated by those skilled in the art that it is possible to variously modify and change the present invention, without departing from the spirit and regions of the present invention described in the claims below.

The invention claimed is:

1. An optical sheet assembly comprising:
   a first optical sheet which comprises a first base film and a first optical pattern formed on the first base film, light being incident on the first base film;
   a second optical sheet which comprises a second base film and a second optical pattern formed on the second base film, the light exiting from the first optical sheet being incident thereon; and
   a third optical sheet which comprises a third base film and a third optical pattern formed on the third base film, the light exiting from the second optical sheet being incident thereon,
   wherein the first to third optical patterns perform a light condensing or diffusing function, and the first optical sheet is joined with the second optical sheet, and the second optical sheet is joined with the third optical sheet, and
   wherein the first optical sheet performs the diffusing function, and the second optical sheet and the third optical sheet perform the light condensing function.

2. The optical sheet assembly of claim 1, wherein at least one of the second base film and the third base film has a plurality of protruding division regions formed on at least one back side of the second base film and the third base film.

3. The optical sheet assembly of claim 2, wherein the division regions are adjacent to each other and are formed over the entire at least one back side of the second base film and the third base film.

4. The optical sheet assembly of claim 3, wherein the division regions are partitioned by a line-shaped groove.

5. The optical sheet assembly of claim 1, wherein an air gap is formed between the second optical sheet and the first optical sheet.

6. The optical sheet assembly of claim 2, wherein the optical pattern of the second optical sheet is partially joined to at least one of the plurality of the protruding division regions formed on the back side of the third base film.

7. The optical sheet assembly of claim 1, wherein the first optical pattern is made up of the diffusion pattern, and the second and third optical patterns are made up of the light condensing pattern, and the first optical pattern is joined to the second optical sheet, and the second optical pattern is joined to the third optical sheet.

8. The optical sheet assembly of claim 7, wherein the first optical pattern is joined to the second base film.

9. A backlight unit comprising the optical sheet assembly of claim 1.

10. A display device comprising the backlight unit of claim 9.

11. An optical sheet assembly comprising:
    a first optical sheet which comprises a first base film and a first optical pattern formed on the first base film, light being incident on the first base film;
    a second optical sheet which comprises a second base film and a second optical pattern formed on the second base film, the light exiting from the first optical sheet being incident thereon; and
    a third optical sheet which comprises a third base film and a third optical pattern formed on the third base film, the light exiting from the second optical sheet being incident thereon,
    wherein the first to third optical patterns perform a light condensing or diffusing function, and the first optical sheet is joined with the second optical sheet, and the second optical sheet is joined with the third optical sheet, and
    wherein a thickness of the second base film is greater than a thickness of the third base film, and the thickness of the third base film is greater than a thickness of the first base film.

12. The optical sheet assembly of claim 11, wherein the first optical sheet has a diffusion pattern that is formed on at least one of a top surface and a bottom surface of the first base film.

13. The optical sheet assembly of claim 12, wherein the diffusion pattern is formed on both of the top surface and the bottom surface of the first base film, and the diffusion pattern is made up of an engraved pattern or an embossed pattern.

* * * * *